(12) United States Patent
Smith et al.

(10) Patent No.: US 7,520,212 B2
(45) Date of Patent: Apr. 21, 2009

(54) APPARATUS FOR FORMING A HEAD ON A BEVERAGE

(75) Inventors: Paul Smith, Hertford (GB); Justin Walshe, Malmesbury (GB)

(73) Assignee: Diageo Limited, Dublin (IE)

( * ) Notice: Subject to any disclaimer, the term of this patent is extended or adjusted under 35 U.S.C. 154(b) by 821 days.

(21) Appl. No.: 10/522,360

(22) PCT Filed: Jul. 30, 2003

(86) PCT No.: PCT/GB03/03334

§ 371 (c)(1),
(2), (4) Date: Jan. 26, 2005

(87) PCT Pub. No.: WO2004/011362

PCT Pub. Date: Feb. 5, 2004

(65) Prior Publication Data

US 2005/0229674 A1    Oct. 20, 2005

(30) Foreign Application Priority Data

Jul. 31, 2002  (GB) ................... 0217768.1

(51) Int. Cl.
*B67D 1/08* (2006.01)
*A23L 1/025* (2006.01)

(52) U.S. Cl. ............ 99/451; 99/275; 366/110; 366/111; 366/114

(58) Field of Classification Search ........... 99/275, 99/451; 366/108, 110, 111, 114, 116
See application file for complete search history.

(56) References Cited

U.S. PATENT DOCUMENTS 6,039,694 A * 3/2000 Larson et al. ............ 600/459
6,719,699 B2 * 4/2004 Smith .................... 600/459

FOREIGN PATENT DOCUMENTS

| | | |
|---|---|---|
| DE | 743822 | 1/1944 |
| DE | 880733 | 6/1953 |
| DE | 858982 | 9/1953 |
| EP | 0 170 497 A1 | 2/1986 |
| GB | 1 378 692 | 12/1974 |
| GB | 1 479 737 | 7/1977 |
| GB | 1 588 624 | 4/1981 |
| GB | 2 089 322 A | 6/1982 |
| GB | 2 166 715 A | 5/1986 |
| GB | 2 369 611 A | 6/2002 |
| JP | 04-253691 | 9/1992 |
| JP | 08-098675 | 4/1996 |
| JP | 11-009256 | 1/1999 |
| WO | WO 98/42612 | 10/1998 |
| WO | WO 98/42613 | 10/1998 |
| WO | WO 99/60092 | 11/1999 |
| WO | WO 01/36582 A1 | 5/2001 |

* cited by examiner

*Primary Examiner*—Reginald L Alexander
(74) *Attorney, Agent, or Firm*—Brooks Kushman P.C.

(57) ABSTRACT

An apparatus for forming a head on a beverage using ultrasonic energy, the apparatus (10) including an hydrating means (20) such that a layer of water is provided to keep a platform (19), which is in turn coupled to an ultrasonic transducer, maintained in conductive contact with the base (B) of a glass (G) of beverage. The water layer improves the transfer of ultrasonic energy to the beverage in the glass. Preferably the water layer is provided through a pump means coupled to a reservoir (30).

19 Claims, 5 Drawing Sheets

APPARATUS FOR FORMING A HEAD ON A BEVERAGE

TECHNICAL FIELD

The present invention relates to a method and apparatus for forming a head on a beverage, and in particular on a beverage which contains gas in solution. The gas in solution may be carbon dioxide, nitrogen or any other inert gas suitable for the purpose. The beverage may be alcoholic or non-alcoholic, but the present invention is particularly suited for use with beverages such as beer, lager, ale and stout, where the presence of a head on the beverage when it is presented to the consumer in a drinking vessel is traditional and desirable.

BACKGROUND ART

Several different methods of forming a head on a beverage have been proposed, including various means employed when the beverage is dispensed from a keg or similar bulk container into a drinking vessel. Such means, for example, include a device known as a sparkler which disturbs the flow of the liquid such that the gas in the liquid is encouraged to come out of solution. It is not always possible for a bar or similar outlet to store beverages in bulk containers such as kegs, however, primarily due to space and cost constraints. The space needed to store kegs is clearly significant, and the associated dispensing and chilling equipment also involves significant cost for the proprietor. Many establishments therefore concentrate on selling beverages stored in bottles or cans, which are usually kept in display fridges behind the bar. However, this then presents the problem that, when transferring the beverage from a bottle to a glass, conventional methods of head generation employed with keg or barrel delivery systems cannot be employed.

It is known to employ ultrasonic excitation to produce or increase a head on a beverage. The ultrasonic excitation causes cavitation of the liquid which encourages the gas in the liquid to come out of solution. The gas thus forms as tiny bubbles which migrate to the surface of the liquid, forming a head of froth on the surface. The equipment required is relatively straightforward and does not require much space, and therefore is suitable for use in establishments of the type discussed above which stock only bottled or canned beverages and which may have space constraints.

GB-A-1588624 (Arthur Guinness Son & Company) discloses the use of ultrasonic vibration to form a head of froth. The beer is poured manually from a bottle into a glass, the glass is then placed on a platform of an ultrasonic transducer and the ultrasonic vibration is switched on for a time sufficient to produce the desired head.

GB-A-2166715 (Bass plc) also relates to forming a head ultrasonically. In one embodiment, a shallow metal dish with an electromagnetic transducer on its underside is recessed into a bar counter. After a glass of beer has been dispensed, the glass is placed in the dish and the transducer is operated under the control of a timer to generate the ultrasonic vibrations which form the head.

In both the above prior art systems, the use of water to improve the coupling between the ultrasonic platform and the glass is suggested. Even if a glass or drinking vessel is designed to have a flat base, the base will rarely be perfectly planar due to the nature of the material and the way the glass is manufactured. Therefore, if the glass is placed on a dry platform, the vessel will contact the platform only at a few points and an air gap will exist elsewhere between the two. This air gap greatly reduces the efficiency of the transfer of ultrasonic energy to the glass. By providing a water-filled ultrasonic bath, as is suggested in the prior art, water fills the gaps between the glass and platform, and also surrounds at least the lower portion of the glass, thus improving the efficiency of the energy transfer.

There are certain disadvantages with the use of an ultrasonic bath according to the prior art for the production of a head on a beverage contained in a glass or other vessel. Primarily, the system requires human intervention to maintain the water level in the bath at the optimum level. The water level will fall in use, as some will inevitably be removed each time a glass is taken out of the bath, and the ultrasonic energy also causes a small amount of water to evaporate each time the transducer is activated. Clearly, it is undesirable to rely on human intervention (especially busy bar staff) to keep the water level topped up.

DISCLOSURE OF THE INVENTION

It is therefore an object of the present invention to provide an improved method and apparatus for forming a head on a beverage that overcomes the aforementioned problem, particularly a simple to use device that does not require the user to perform multiple operations or, at least, minimises maintenance operations.

According to a first broad aspect of the invention there is provided an apparatus for the formation of a head on a beverage contained in a vessel, including an ultrasonic oscillator for generating an electric signal having an ultrasonic frequency, a transducer connected to the oscillator for converting the electrical signal into a physical ultrasonic excitation, a contact surface coupled to the transducer, onto which the vessel containing the beverage is placed in use, wherein means is provided for maintaining an hydrated layer on the contact surface throughout the period of use.

The provision for maintaining a constant, particularly replenishing, water layer is a new departure in the field of the invention.

The word "coupled" is intended not to exclude there being additional components between the contact surface and the transducer. For example, the contact surface may be mounted or located on a platform or tray which is in turn mounted on the transducer. Thus, the word "coupled" may include arrangements wherein the contact surface is not directly adjacent or part of the transducer. However, it is of course necessary for the ultrasonic excitation to be adequately transmitted to the contact surface in any physical arrangement.

In a preferred embodiment, the contact surface includes a tray having a raised edge, such that a water film or layer is contained on the apparatus and does not drain off.

The maintenance of the film or layer of water on the contact surface or platform can be performed by apparatus, which will be referred to as "hydration means" below.

Suitable hydration means for use in preferred embodiments of the invention may be totally automatic, in that no human operation or intervention is required at any time during normal operation of the device, or it may be semi-automatic in that periodic checking and/or maintenance may be required. It is however preferable that any periodic maintenance intervals are as long as possible. It will be clear to the reader which devices described below belong to which category.

As an example, the hydration means can comprise a refrigeration means. Preferably, means are provided for chilling the platform or tray as appropriate to a temperature below that of the ambient environment. In this way, atmospheric moisture will condense on the surface and will thus hydrate it. Preferably, the refrigeration means chills the surface to a temperature below the dew point of the surrounding atmosphere, and more preferably to between about 0° C. and about 5° C.

It will be apparent to the skilled person that there are many different ways of chilling the surface of the contact surface, all of which would be acceptable. In some establishments, there already exists a supply of refrigerant (such as chilled water or other cooling liquid) and this may be conveniently utilised in the present invention to minimise capital outlay. The refrigerant may simply be piped through the apparatus and returned to the refrigeration unit. Thus, in this embodiment, the refrigeration means preferably comprises a passage through the apparatus through which, in use, a refrigerant may be passed such that the contact surface is sufficiently chilled and atmospheric moisture condenses on the surface thereof. The apparatus may further be provided with inlet and outlet ports in communication with the interior passage, and optionally the passage may be provided with a chamber.

Alternatively, it may be necessary to provide the apparatus with its own cooling system, such as a refrigeration unit based on a conventional design or any other e.g. thermo-electric.

In accordance with other embodiments, the hydration means preferably comprises a hydration system in which water is fed to the tray. The water may be fed direct from the water supply system of the establishment, or may be supplied from a reservoir which is part of the apparatus. The reservoir may require periodic checking and refilling, or may be provided with automatic refilling means, such as a float-controlled (cistern) valve or ball valve for example. The reservoir may be provided with level indication means which gives the operator an indication of the water level inside and/or an indication of when the reservoir requires refilling. The water may be fed simply under gravity, by pump or by wicking.

However, the preferred embodiment features a contact surface comprised of a platform (note that a recessed tray is not mandatory) onto which a measured quantity of water is pumped from below. Such an arrangement requires the platform to have an aperture (e.g. centrally) in its surface through which a 'shot' of water e.g. 2 to 5 mL is pumped just before the transducer is activated. Such a transducer, coupled below the aperture in the platform, will be donut shaped so as to have a tube delivering the shot of water passing therethrough. The pump would most appropriately be a peristaltic type pump for this application, but could be any type of pump or valve capable of delivering a preset amount.

Successful use of the apparatus may occur in one user operation, i.e. the glass of beverage is placed upon the platform and a switch activates in sequence firstly the pump to deliver a water shot and secondly the ultrasonic transducer to deliver ultrasonic energy to the now water saturated base of the glass. However it is also possible to have an intentional "two hands" operation meaning a pump button must be held down in a combination with a switch in order to activate the ultrasonic circuit.

In one embodiment the means by which a constant ultrasonic conductive layer is maintained can include a hydrophilic material.

The hydrophilic material should have a relatively high water content (preferably 65-70%), and is preferably substantially saturated. In this way, there will be sufficient water between the transducer and vessel that the transfer of ultrasonic energy will be improved compared to a "dry" transfer arrangement. Notably, even in the case where the hydrophilic material is substantially saturated, it is not "wet" in appearance.

Thus, by using a hydrophilic material the present invention provides a system for the transfer of ultrasonic energy to a drinking vessel having the advantages of a "wet" ultrasonic bath as discussed above due to the presence of water between the vessel and the transducer, but without the disadvantages. The hydrophilic material will mould to the bottom of the glass for complete contact and can be wiped clean in the event of any spillages.

A preferred hydrophilic material for use in the present invention is Hydrogel (trade name). This is essentially a plastic material having a relatively high water content (30-80%) that has been used to form disposable contact lenses. Materials such as Hydrogel, due to their relatively high water content, behave like water in the way they transmit ultrasonic energy, but do not present the disadvantages associated with water baths as discussed above. Hydrogel is also flexible and resilient when saturated, and therefore is able to readily mould to the contours of the base of a drinking vessel in use, such that the coupling between the transducer and vessel is optimised. The preferred thickness of Hydrogel is 1 mm. While this material (and water) is a much more effective conductor than air, ultrasonic energy still decays very swiftly, therefore it is preferable to have as thin a layer as possible. In order to reduce the risk of mould growth etc., the hydrophilic material may contain an anti-bacterial or anti-fungal agent (eg. Microban).

Depending on the type of hydrophilic material and the manner of its use, the material may not require any maintenance to keep it sufficiently hydrated. The material may be such that evaporation of water from its surface is relatively slow or such that any water loss therefrom is offset by water or other liquid present on the vessel when it is brought into contact with the material, thus automatically maintaining the material in a sufficiently hydrated condition. Water may be present on the base of the glass by virtue of condensation, for example, if the liquid it contains is sufficiently chilled.

Some materials may require periodic rehydration or maintenance to keep them in a hydrated condition. This could be effected manually by the operator, by simply wetting the surface of the material at intervals, e.g. once before use or perhaps when the material is being cleaned, with a spray. The material should preferably remain sufficiently hydrated for the time that the establishment is open. Manual rehydration could be effected by placing the material in a bath of water once the premises are closed, rehydrating the material in preparation for the next session.

Ideally, however, the hydrophilic material is maintained in a sufficiently hydrated condition without continual reliance on human intervention. Preferably therefore, the apparatus in accordance with the invention further comprises means for maintaining the hydrophilic material or contact surface in a hydrated condition.

As a further improvement in the field of producing a head of froth on a beverage by means of ultrasonic excitation, the applicant has developed a system which optimises the transfer of ultrasonic energy to the vessel and thus to the beverage. This improved system is capable of application with any of the embodiments and preferred features thereof discussed above.

A further problem identified with prior art ultrasonic frothing devices is the apparently inconsistent nature of the device depending on the type of glass used. The basis for using ultrasonic energy as a frothing method lies in the ability to provide a resonant frequency. However, the exact value of the resonant frequency will vary slightly depending on the thickness of the glass base. The prior art does not account for this and therefore some unreliability can arise during use of the device from one glass to another.

Therefore it is a further object of the invention to provide a method for forming a head on a beverage that can effectively form said head over a range of glass thicknesses and types, thereby becoming more reliable.

In accordance with a second aspect, the invention provides a method of forming a head of froth on a beverage contained in a vessel, comprising the steps of:

generating an electrical signal having a variable ultrasonic frequency, converting the electrical signal into a physical ultrasonic excitation, subjecting the vessel containing the beverage to the ultrasonic excitation for a predetermined time, and during the predetermined time, varying the frequency of the electrical signal such that the vessel and beverage are subjected to a predetermined range of ultrasonic frequencies.

By use of this method the glass, whatever the base thickness (within limits), is ensured to be subjected to the required resonant frequency for at least a fraction of the application time. It is noteworthy that even this fraction of a time (which may amount to hundredths of a second) is sufficient to cause the required excitation.

In a preferred example electronic circuitry is employed to effect monitoring of the electrical signal to determine the frequency at which maximum resonance of the vessel and beverage is achieved and then maintaining the excitation at this maximum resonant frequency for the remaining time of application of the excitation. Preferably, the ultrasonic frequency is varied at the start of the predetermine application time so the maximum length of time is available at the "optimised" frequency.

This method thus provides a more efficient transfer of ultrasonic energy for a wide range of vessels and beverages, which might even permit a reduction in the ultrasonic application time in some circumstances.

This aspect also extends to apparatus for carrying out the method defined above. More specifically, in accordance with a third aspect, the present invention provides apparatus for forming a head of froth on a beverage contained in a vessel, comprising:

an ultrasonic oscillator for generating an electrical signal having a variable ultrasonic frequency;

a transducer connected to the oscillator for converting the electrical signal into a physical ultrasonic excitation;

a surface coupled to the transducer, onto which the vessel containing the beverage is placed in use to be subjected to the ultrasonic excitation for a predetermined time;

and a control means such that, during the predetermined application time, the frequency of the electrical signal is varied such that the vessel and beverage are subjected to a range of ultrasonic frequencies.

In one embodiment the control means is provided to monitor and adjust the frequency to determine a maximum resonance of the vessel and beverage.

It is envisaged that there will be a number of different ways of measuring when the vessel and beverage are in resonance, all of which will be acceptable in the present invention. Preferably, the means for monitoring the electrical signal monitors the current being drawn by the transducer circuit. At resonance, a peak in current will occur, and this peak in current will trigger the maintenance of the applied ultrasonic excitation at the frequency being applied when the drop in current occurs.

The total application time for either the basic or advanced method is preferably between one and five seconds.

BRIEF DESCRIPTION OF DRAWINGS

FIG. 3a is a section view of a preferred embodiment of the invention utilising a bottom fed platform, while

MODE(S) FOR CARRYING OUT THE INVENTION

Figure 1:
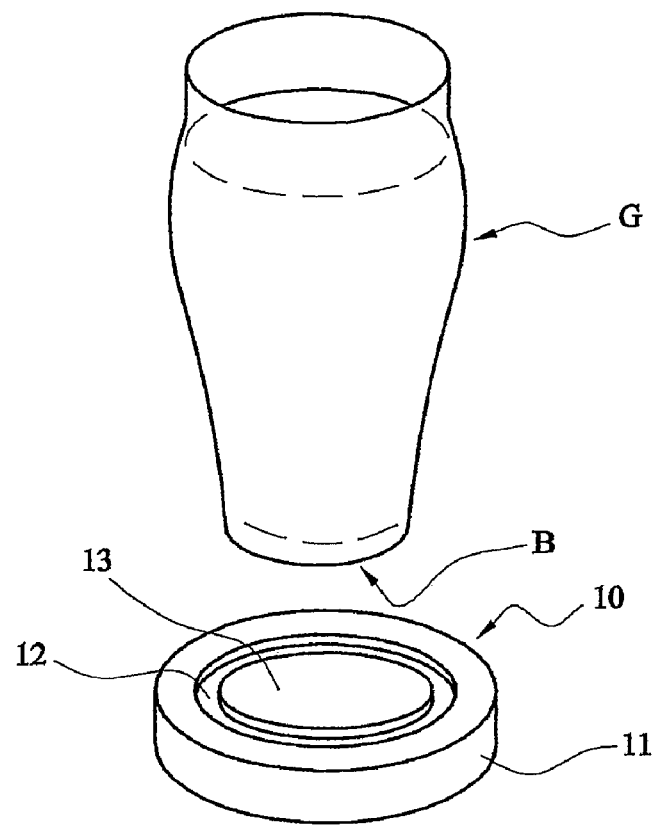
FIG. 1 is a general overview of one embodiment of the present invention, also showing a standard glass vessel.

Referring firstly to FIG. 1, a standard glass G (e.g. 1 pint) is illustrated to be placed on apparatus, generally denoted 10, for forming a head on the beverage within glass G. The "flat" beverage (i.e. not fizzy and with a low level of gas out of solution) is preferably filled in the glass up to a level just below the rim, such that the remaining area is to be filled with a head. For the intended purpose of the present invention, the vessel delivering the beer is a bottle which will be a standard volume, hence the pourer will not need to measure out a specified amount to ensure room is left for a head. Preferably beer is poured smoothly into a glass so as not to cause premature excitation of gas.

It will be apparent that the present invention is also useful for forming a head on draught beer straight from a tap, without the need for sparkler type devices as described in the preamble.

As visible in FIG. 1 the apparatus 10 includes a generally circular tray 11 that includes a shallow recess portion 12. Such a recess 12 may contain a quantity of water or, as illustrated, an hydrophilic material 13. Material 13 may be, by way of example, Hydrogel formed into a thin disc (1 mm thick) that is roughly dimensioned the same, or slightly larger, as the diameter of a base B of glass G.

Hydrogel 13 has a water content of, preferably, 65 to 70% to provide a soft contact surface upon which the base B may be placed. The very nature of the Hydrogel 13 means it contacts the substantive surface of base B, with no air gaps as can occur on a "dry" surface.

Not shown by FIG. 1 is an ultrasonic crystal coupled underneath the contact surface 12 of tray 11. Ultrasonic energy is transferred through the tray (as is known by the prior art) then through the Hydrogel and into the glass of beverage wherein gas in solution is excited to cavitate, rising fine bubbles to the surface that then form a froth ("head").

In this basic embodiment the Hydrogel is expected to retain its moisture content for a prolonged period and, in any event, considerably longer than an equivalent 1 mm layer of water would last. The Hydrogel covered contact surface 12 is thus relatively self sufficient, at least so far as required for one evening's use.

Figure 2:
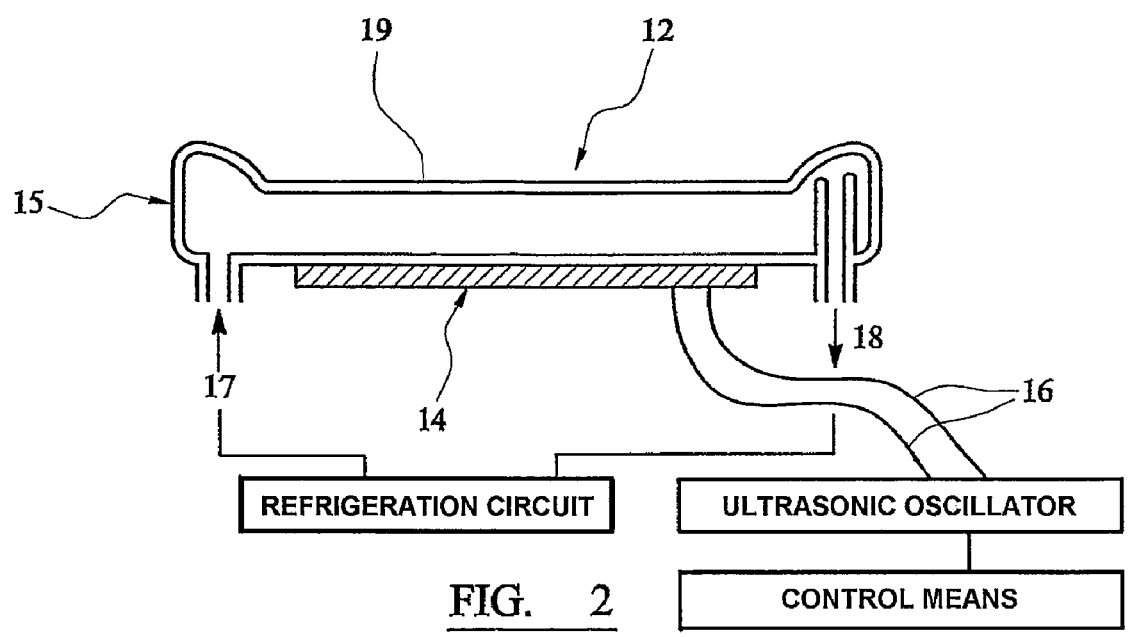
FIG. 2 is a section view of a further embodiment of the invention.

FIG. 2 illustrates a second embodiment of an apparatus 10 according to the invention. In this example, an ultrasonic transducer (crystal) 14 is visible on the underside of a hollow disc shaped element 15, also featuring a shallow recessed portion 12, much the same as tray 11 of FIG. 1. Wires 16 carry alternating current from an ultrasonic oscillator operated by a control unit, i.e. control means, to cause the transducer 14 to vibrate.

As a means of maintaining a layer of moisture within recess 12, chilled water is passed by a refrigeration circuit from an input end 17 toward an output end 18 of hollow disc 15. The chilled water causes a lowered temperature of contact surface 19 and hence condensation to form from the ambient air. The constant layer of water needed for substantive contact with base B can therefore be provided from this condensation.

It will be noted from FIG. 2 that the arrangement of the output end tube 18 is such that chilled water cannot exit from disc 15 until it is at least in contact with the inside of surface 19. It is imperative to maintain the chamber within disc 15 completely full of water, otherwise ultrasonic energy cannot transfer from transducer 14, through the chilled water into surface 19 where it is passed (via condensation) to glass G.

Figure 3A:
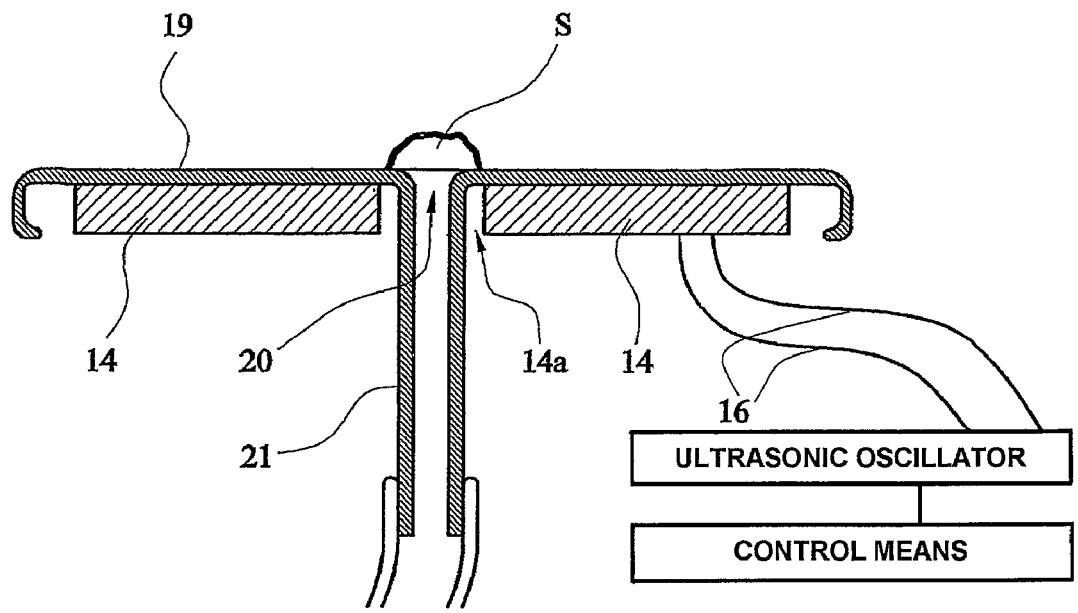

FIG. 3a illustrates a preferred embodiment of the apparatus 10 according to the present invention wherein a specified amount (e.g. a 1 to 5 mL "shot") of water S is pumped up (or by mains pressure in combination with a valve) through an aperture 20 in the contact surface (platform) 19. The water is supplied immediately prior to activating transducer 14 so that, in practice, only a single operation is required to be performed by the human operator because the steps can be automated in sequence.

Figure 3B:
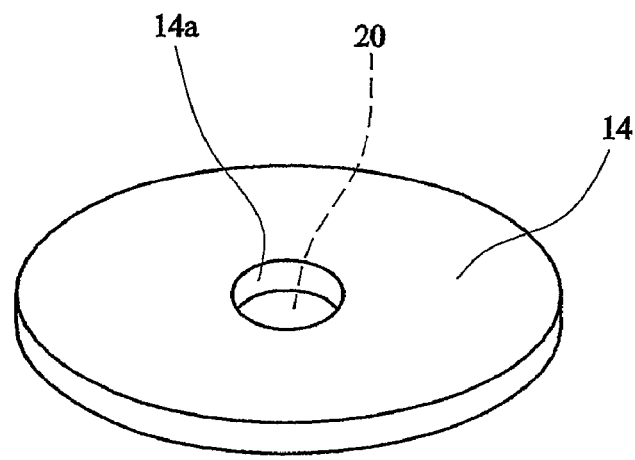
FIG. 3b is a general view of a transducer as used in FIG. 3a, FIG. 4 is a section view variant of the embodiment from FIG. 3, also incorporating an hydrophilic material.

As illustrated by the sectional view of FIG. 3a, and detailed by FIG. 3b, transducer 14 is donut shaped in that it has a central hole 14a that surrounds a tube 21 for delivering water through the aperture 20.

A variety of electric or mechanical pump means can be used to effect pumping of water into/onto contact surface 19. In one form, the ultrasonic platform may have the get-up of a traditional beer pump/handle (see hereinafter) for drawing a draught of beer into a glass. Therefore the handle pumping action of the operator may cause a mechanical pump to deliver water to contact surface 19 and then, at the end of the pull, an electric switch will trigger to activate the ultrasonic transducer.

Further embodiments may be developed wherein an ultrasonic platform is integrated into a conventional tap configuration, the ultrasonic device being activated after the beer is poured from the tap (all on one platform) to form a head. This alleviates the need for sparkler or other excitation means.

Figure 4:
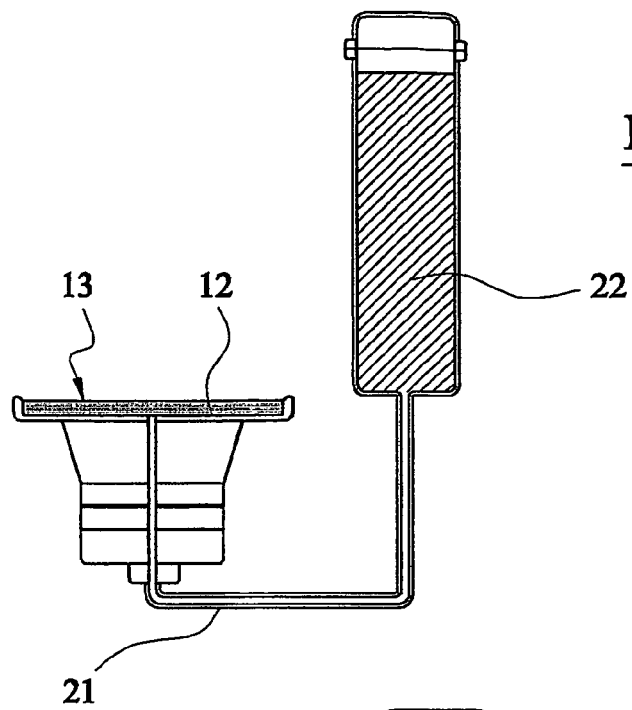

FIG. 4 illustrates a variation on the central delivery method of FIG. 3a by use of a reservoir 22 for maintaining the availability of water. An hydrophilic material 13 as aforementioned is clipped in recess 12 and kept almost indefinitely hydrated by the water from reservoir 22 via tube 21. Reservoir 22 must be periodically refilled.

Figure 5B:
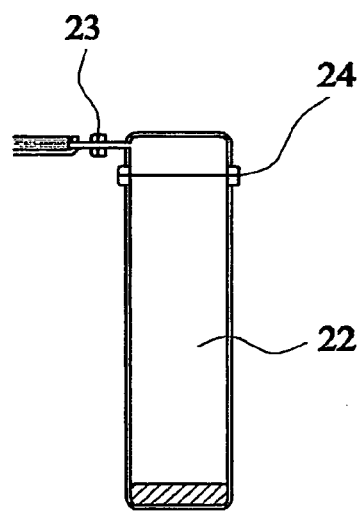
FIGS. 5a and 5b are section view variants of yet a further embodiment of the present invention.
Figure 5A:
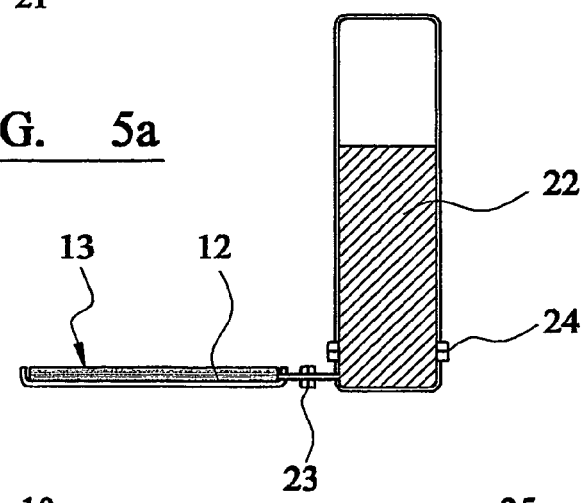

FIGS. 5a and 5b are a further variation from the reservoir 22 illustrated by FIG. 4.

Reservoir 22 side feeds into recess 12 wherein Hydrogel absorbs the moisture for maintaining contact with glass G.

FIG. 5b shows the reservoir twisted about a tubular coupling 23. It is then unscrewed from a lid 24 and refilled.

The foregoing arrangements are effective but likely to be cumbersome in use.

Figure 6:
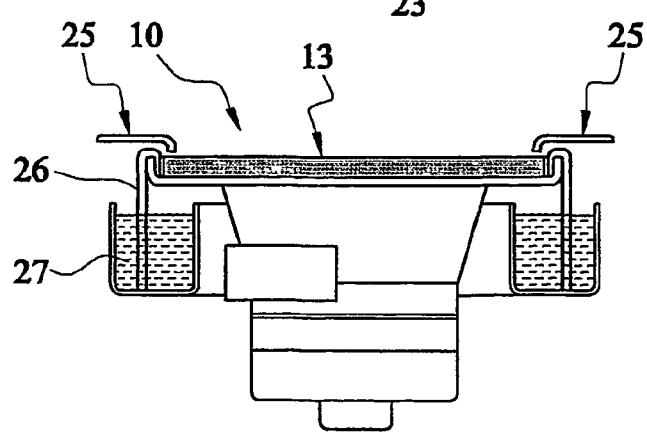
FIG. 6 is a further embodiment relying on a wick feed of moisture.

FIG. 6 shows an embodiment of the apparatus 10 that could be recessed into a bar top 25 wherein one or more wicks 26 communicate water from a reservoir 27 to the contact surface, in this case Hydrogel 13.

Figure 7:
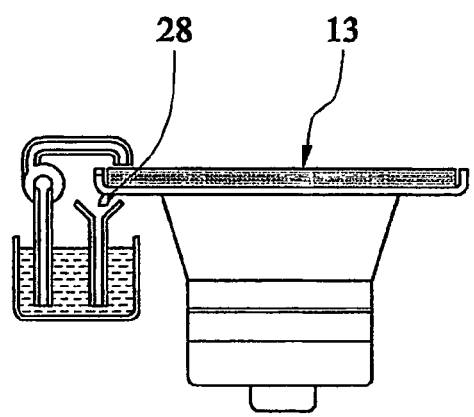
FIG. 7 is a further embodiment relying on a pump means.

FIG. 7 is a variation on the automated pump illustrated by FIG. 3a wherein water is delivered from the side and/or above contact surface/Hydrogel 13. The tray 11 further has a drain 28 to remove excess water.

Figure 9B:
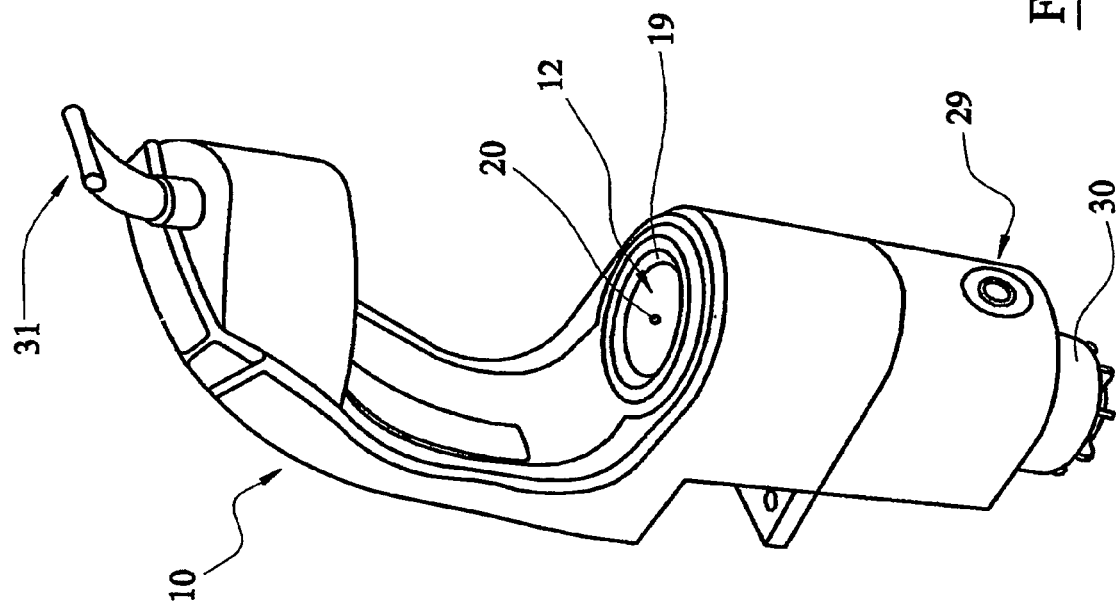
FIGS. 9a and 9b illustrate side and rear pictorial views of the preferred embodiment.
Figure 9A:
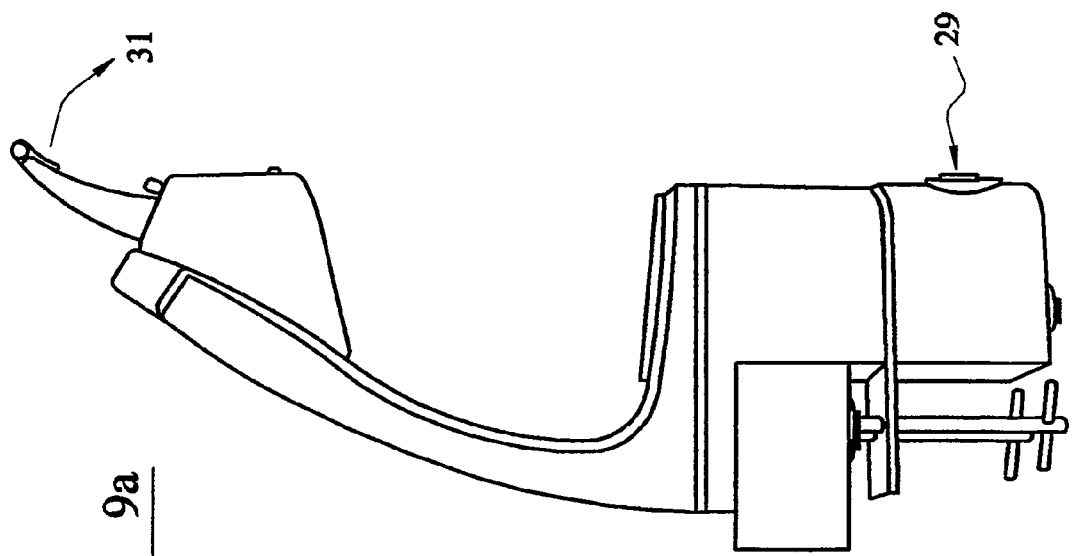

A pictorial view of the present invention in it's preferred form is illustrated by FIGS. 9a and 9b.

A recessed portion 12 includes an aperture 20 that delivers a 2 to 5 ml shot of water to contact and cover the entire base of a glass (not illustrated).

Water is supplied via a button 29 coupled to a peristaltic pump within the housing. The pump draws water from a screw-in reservoir 30 at the base of the said housing. It is intended that even a small reservoir as illustrated is sufficient for up to 500 "shots". Thereby only requiring to be refilled within several days, or even weeks. Replacement can be prompted by a level indicator light.

When initially installed the tube (e.g. 21 in FIG. 3a) will need to be primed, i.e. filled with water. However, this should only be needed once. Preferably the water within the reservoir 30 is provided with an anti-bacterial agent (such as a purification tablet).

During use a glass of beverage is placed in recess 12 and button 29 is depressed (preferably only once) to pump water to said recess 12. The button or switch 29 is held depressed where it makes the ultrasonic circuit live. A second lever or switch 31 (resembling a beer tap Handle) is pulled to activate the circuit. "Two hands" operation in this way is an added safety feature, although the frequency and power of the ultrasonic energy is nowhere near sufficient to cause harm.

The unit illustrated by FIGS. 9a and 9b may be clamped to a bench (bar top) by conventional means so as to be substantially in the form of a bar top beer pump.

The unit illustrated by FIGS. 9a and 9b may be clamped to a bench (bar top) by conventional means.

The unit electronics can be automatically deactivated when the reservoir 30 is empty.

Each of the foregoing embodiments described has the common feature of ensuring that there is substantial conductive contact between the base of the glass and the contact surface being acted on by the ultrasonic transducer for the time required to perform the ultrasonic excitation.

However, little or no excitation may occur if the ultrasonic frequency generated by the transducer is not specific to the requirements of the particular glass. Therefore it is necessary to have a suitable control means to activate transducer 14.

In other ultrasonic applications it is generally desirable to produce apparatus wherein the physical ultrasonic transducer (often a composite of sandwiched materials) is tuned (i.e. machined to a desired thickness) to the generator electronics. However, with the present invention it is more desirable to adjust the generated signal to a frequency that matches resonance of the transducer/tray apparatus 10. This makes manufacture considerably cheaper.

The range of frequencies for current supplied to the transducer will be fixed at manufacture. These will generally be in the order of 20 kHz to 80 kHz. But while it is possible to calculate the required frequency for the transducer acting on an "average" glass base, this will rarely be an exact match due to the inherent variations in the glass.

Figure 8A:
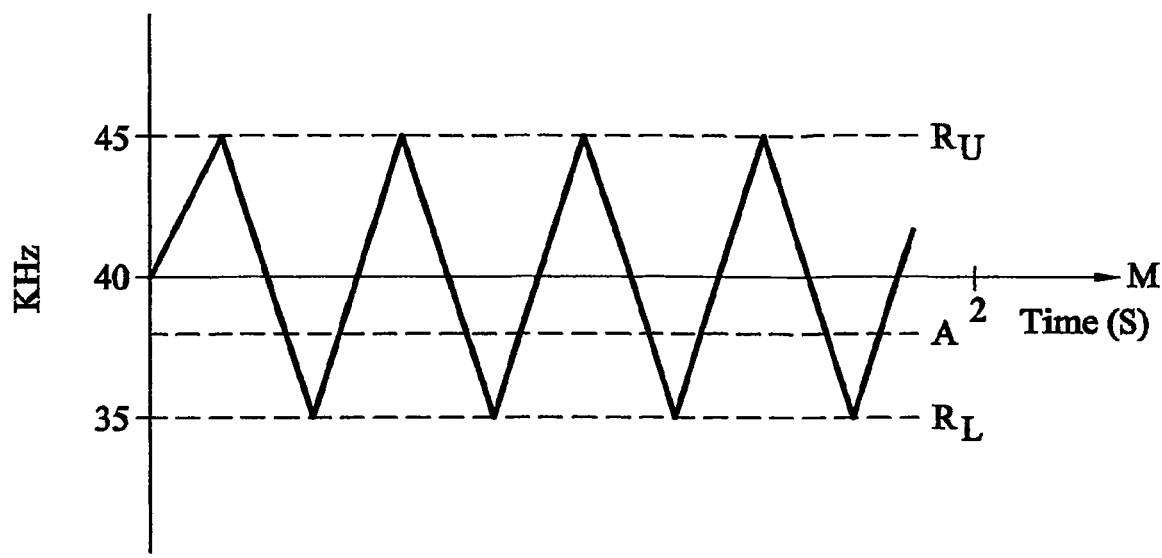
FIGS. 8a and 8b are graphic representations of a method of achieving consistent results from a device for forming a head on a beverage in accordance with the present invention.

The control means therefore generates a frequency that varies over time around a median which corresponds to the resonant frequency required for an "average" glass. FIG. 8a illustrates this deliberate variation in simple graphical form.

Figure 8B:
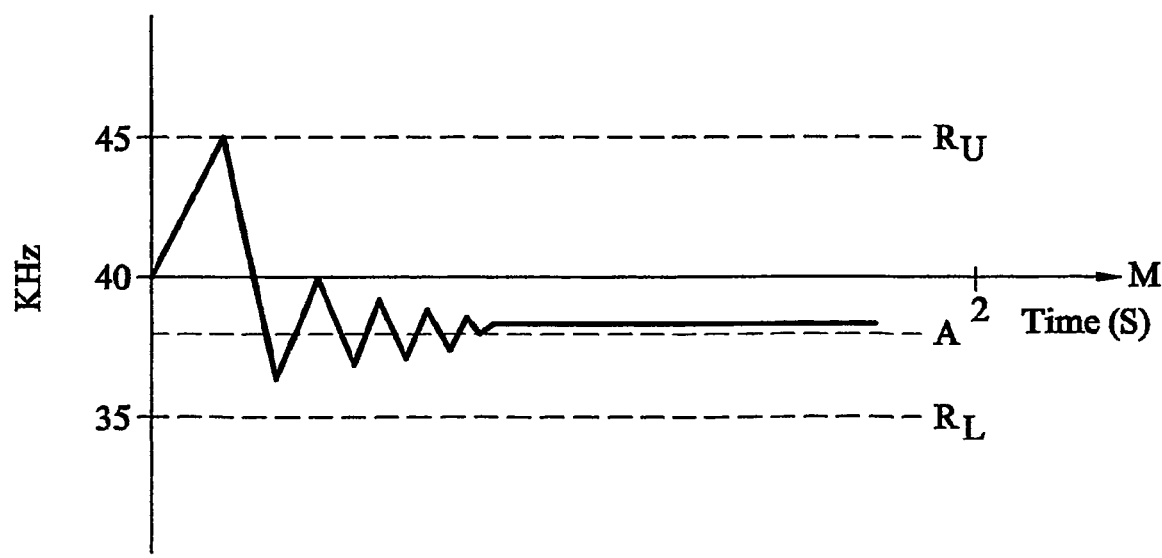

The y axis of FIG. 8a represents frequency in kilohertz against the x axis for time. The total time that the apparatus is switched on is up to five seconds, preferably two seconds as shown in FIGS. 8a and 8b.

At time 0 the apparatus initially generates an alternating current at 40 kHz (used solely by way of example for the purposes of explanation, this parameter will vary depending on materials used in manufacture etc and can be determined by those skilled in the art). 40 kHz represents the median M frequency required for excitation of an 'average' glass of beer. However the actual frequency required may be above or below this. Dotted line A represents this unknown quantity. Dotted lines $R_U$ and $R_L$ represent the upper and lower ranges of frequency that the device will generate. So long as the unknown frequency A falls within this range $R_U$ and $R_L$ excitation of the beverage is ensured even if for a brief fraction of the overall time. As shown by the graph resonant frequency is reached every time the plotted line crosses the dotted line A.

The ranges $R_U$ and $R_L$ illustrated are 45 kHz and 35 kHz respectively. This is perhaps exaggerated from practice where the "sweep" of frequencies may be only a few kilohertz.

In the preferred embodiment of the hydrating means apparatus, the control means will perform multiple sweeps of frequencies between e.g. 39 and 41 kHz for three seconds, hence ensuring that resonance is achieved at least several times within those three seconds.

FIG. 8b illustrates a further embodiment wherein the control means 'scans' for the unknown quantity A. Frequency generation begins as in FIG. 8a, however, when the control means senses resonance it performs iterative sweeps to 'lock' onto the resonant frequency. As described in the preamble such a sensing means can look for a simple peak in power drawn by the transducer. Over time (a split second) the control means can adjust the frequency to where the power drawn is greatest and hence achieve maximum resonance. The remainder of the excitation time is therefore performed at maximum resonance.

It is further observed that pulsing current to the transducer can increase excitation effectiveness of the apparatus. This can be applied to either of the methods described.

INDUSTRIAL APPLICABILITY

The method and apparatus according to the present invention as hereinbefore described is primarily advantageous because it is simple to use. The apparatus can be manufactured in a number of guises using available materials. Ideally the unit will be compact and fit comfortably into a commercial bar type of environment. It provides not only a practical benefit in that the appearance and taste of the beer is enhanced, but also a uniqueness by virtue of the process that will catch the attention of the consumer. Prior art ultrasonic methods have not been widely adopted because of the problems experienced. The present invention reintroduces the technology in an improved form.

The invention claimed is:

1. An apparatus for the formation of a head on a beverage contained in a vessel, including an ultrasonic oscillator for generating an electric signal having an ultrasonic frequency, a transducer connected to the oscillator for converting the electrical signal into a physical ultrasonic excitation, a platform including a recess portion that at least corresponds in area to a base of the vessel intended for use and has a contact surface coupled to the transducer and onto which the vessel containing the beverage is placed in use, and means for controlling a supply of water to the recessed portion of the platform to maintain a hydrated layer on the contact surface substantially throughout a period of use.

2. The apparatus of claim 1 wherein means for maintaining the hydrated layer includes a hydrophilic material.

3. The apparatus of claim 2 wherein the hydrophilic material is Hydrogel.

4. The apparatus of claim 3 wherein the Hydrogel is substantially 1 to 2 mm thick and includes a surface area substantially corresponding to a base of the vessel containing the beverage placed thereon, in use.

5. The apparatus of claim 2 wherein the hydrated layer includes an antifungal or antibacterial agent.

6. The apparatus of claim 1 wherein an aperture is provided in the platform.

7. The apparatus of claim 6 wherein the means for controlling the supply of water supplies a measured amount of water to the platform through the aperture.

8. The apparatus of claim 7 wherein the measured amount is 1 to 5 milliliters.

9. The apparatus according to claim 1 wherein a reservoir is provided to supply water to the platform.

10. The apparatus according to claim 1 wherein a main water supply is coupled to the apparatus for delivery to the platform.

11. The apparatus of claim 9 further including a wick means between the reservoir and the platform.

12. The apparatus of claim 1 wherein the apparatus is activated by simultaneously closing two switches, one of these switches associated with the means for controlling the supply of water.

13. An apparatus for the formation of a head on a beverage contained in a vessel, including an ultrasonic oscillator for generating an electric signal having an ultrasonic frequency, a transducer connected to the oscillator for converting the electrical signal into a physical ultrasonic excitation, a contact surface coupled to the transducer and onto which the vessel containing the beverage is placed in use, and means for maintaining a hydrated layer on the contact surface substantially throughout a period of use and including a refrigeration circuit that is arranged to pass by adjacent the contact surface.

14. The apparatus of claim 13 wherein the contact surface has a chamber therebelow including input and output ends for coupling with the refrigeration circuit to allow refrigerant to pass therethrough.

15. Apparatus for forming a head of froth on a beverage contained in a vessel comprising an ultrasonic oscillator for generating an electrical signal having a variable ultrasonic frequency, a transducer connected to the oscillator for converting the electrical signal into a physical ultrasonic excitation, a surface coupled to the transducer, on to which the vessel is placed in use to be subjected to the ultrasonic excitation for a predetermined application time, and a control means such that, during the predetermined application time, the frequency of the electrical signal is varied such that the vessel and beverage are subjected to a range of ultrasonic frequencies and wherein the control means monitors for maximum resonance of the beverage and vessel by measuring the power being drawn by the transducer.

16. The apparatus of claim 15 wherein the control means substantially maintains the maximum resonant frequency for the remainder of the application time.

17. The apparatus of claim 15 wherein the control means pulses the electrical signal for a plurality of predetermined times.

18. The apparatus of claim 15 where the predetermined application time is up to 5 seconds.

19. The apparatus of claim 15 substantially in the form of a bar top beer pump.

* * * * *